US008755960B2

(12) United States Patent  (10) Patent No.: US 8,755,960 B2
McGrogan et al.  (45) Date of Patent: Jun. 17, 2014

(54) METHOD FOR MANAGING BATTERY POWER WITHIN A HYBRID POWERTRAIN SYSTEM

(75) Inventors: Sean W. McGrogan, Ann Arbor, MI (US); Ryan D. Martini, Wolverine Lake, MI (US); Anthony H. Heap, Ann Arbor, MI (US); Wilfried Brunssen, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 916 days.

(21) Appl. No.: 12/776,672

(22) Filed: May 10, 2010

(65) Prior Publication Data

US 2010/0292880 A1    Nov. 18, 2010

Related U.S. Application Data

(60) Provisional application No. 61/178,182, filed on May 14, 2009.

(51) Int. Cl.
*G06F 19/00*    (2011.01)

(52) U.S. Cl.
USPC .......................................... 701/22; 180/65.29

(58) Field of Classification Search
CPC ..... B60K 6/48; H02J 7/1492; Y02T 10/7005; Y02T 10/705; Y02T 10/92
USPC .......................................... 701/22; 180/65.29
See application file for complete search history.

(56) References Cited

U.S. PATENT DOCUMENTS

| | | | |
|---|---|---|---|
| 5,789,881 A * | 8/1998 | Egami et al. ................... | 318/139 |
| 5,903,113 A * | 5/1999 | Yamada et al. ................ | 318/10 |
| 5,939,848 A * | 8/1999 | Yano et al. .................... | 318/139 |
| 6,795,756 B1 * | 9/2004 | Zhang et al. ................... | 701/22 |
| 2002/0108794 A1 * | 8/2002 | Wakashiro et al. .......... | 180/65.2 |
| 2003/0236599 A1 * | 12/2003 | Saito et al. ..................... | 701/22 |
| 2008/0071437 A1 * | 3/2008 | Hirata et al. ................... | 701/22 |
| 2008/0100129 A1 * | 5/2008 | Lubbers ...................... | 303/113.1 |
| 2008/0156551 A1 * | 7/2008 | Kawahara et al. ........... | 180/65.2 |
| 2009/0045780 A1 * | 2/2009 | Bergkoetter et al. ......... | 320/136 |
| 2009/0112427 A1 * | 4/2009 | Heap et al. ..................... | 701/67 |
| 2009/0218987 A1 * | 9/2009 | Tominaga ..................... | 320/134 |
| 2009/0259354 A1 * | 10/2009 | Krupadanam et al. ......... | 701/22 |

FOREIGN PATENT DOCUMENTS

CN          101254744 A    12/2007

* cited by examiner

*Primary Examiner* — Fadey Jabr
*Assistant Examiner* — Lail Kleinman (57) ABSTRACT

A hybrid powertrain system includes an internal combustion engine and a torque machine wherein electrical energy is controllably transferred between an electric energy storage device and the torque machine by a control system. A method for controlling the hybrid powertrain system includes monitoring a voltage, a current, and a power output of the electric energy storage device. A battery power control scheme is executed to control the output power of the electric energy storage device associated with the electrical energy transferred between the electric energy storage device and the torque machine. The battery power control scheme is disabled when the control system loses a power limit authority associated with the electrical energy transferred between the electric storage device and the torque machine during ongoing operation. The battery power control scheme is re-enabled when the control system regains the power limit authority.

16 Claims, 4 Drawing Sheets

FIG. 5 ns rotational position of the resolver rotor to the resolver stator, thus monitoring the rotational position of the resolver rotor. Additionally, the signals output from the resolver(s) 32 are used to determine the rotational speeds for motor/generator(s) 12.

METHOD FOR MANAGING BATTERY POWER WITHIN A HYBRID POWERTRAIN SYSTEM

CROSS REFERENCE TO RELATED APPLICATIONS

This application claims the benefit of U.S. Provisional Application No. 61/178,182, filed on May 14, 2009, which is hereby incorporated by reference.

TECHNICAL FIELD

This disclosure relates to voltage and current control within hybrid powertrain vehicles.

BACKGROUND

The statements in this section merely provide background information related to the present disclosure and may not constitute prior art.

Known powertrain architectures include torque-generative devices, including internal combustion engines and motor/generators, which transmit torque through a transmission device to an output member. One exemplary powertrain includes a two-mode, compound-split, electro-mechanical transmission which utilizes an input member for receiving motive torque from a prime mover power source, preferably an internal combustion engine, and an output member. The output member can be operatively connected to a driveline for a motor vehicle for transmitting tractive torque thereto. Electric torque machines, operative as motors or generators, generate a torque input to the transmission, independently of a torque input from the internal combustion engine. The electric torque machines may transform vehicle kinetic energy, transmitted through the vehicle driveline, to electrical energy that is storable in an energy storage device. A control system monitors various inputs from the vehicle and the operator and provides operational control of the powertrain, including controlling transmission operating state and gear shifting, controlling the torque-generative devices, and regulating the electrical power interchange among the energy storage device and the electric torque machines to manage outputs of the transmission, including torque and rotational speed.

SUMMARY

A hybrid powertrain system includes an internal combustion engine and a torque machine wherein electrical energy is controllably transferred between an electric energy storage device and the torque machine by a control system. A method for controlling the hybrid powertrain system includes monitoring a voltage, a current, and a power output of the electric energy storage device. A battery power control scheme is executed to control the output power of the electric energy storage device associated with the electrical energy transferred between the electric energy storage device and the torque machine. The battery power control scheme is disabled when the control system loses a power limit authority associated with the electrical energy transferred between the electric storage device and the torque machine during ongoing operation. The battery power control scheme is re-enabled when the control system regains the power limit authority.

BRIEF DESCRIPTION OF THE DRAWINGS

One or more embodiments will now be described, by way of example, with reference to the accompanying drawings, in which.

DETAILED DESCRIPTION

Figure 1:
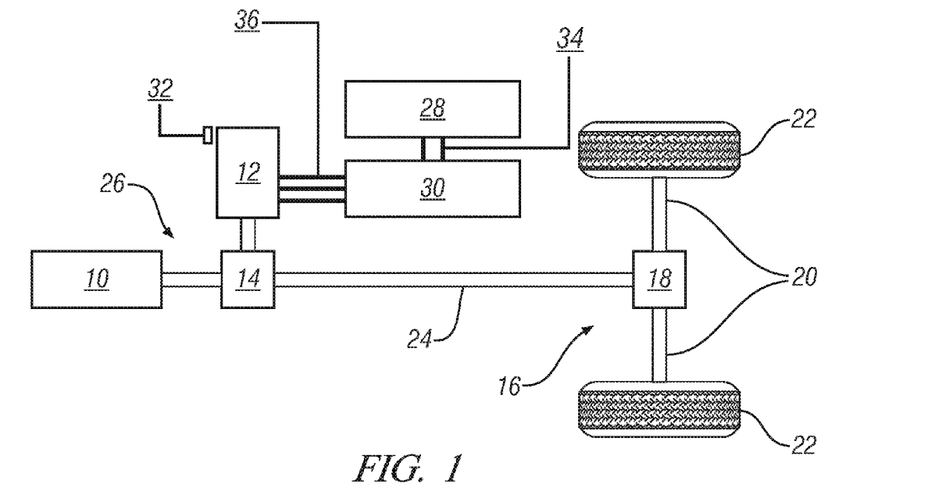
FIG. 1 is a schematic depiction of a hybrid powertrain utilizing an internal combustion engine and a motor/generator(s), in accordance with the present disclosure.

Referring now to the drawings, wherein the depictions are for the purpose of illustrating certain exemplary embodiments only and not for the purpose of limiting the same, FIG. 1 is a schematic depiction of a hybrid powertrain system 26 including an internal combustion engine 10 and motor/generator(s) 12. It should be noted that the hybrid powertrain is illustrative of this disclosure and should not be considered restrictive. The engine 10 can be coupled to a transmission device 14 to transmit tractive power to a driveline 16 of a vehicle. The driveline 16 includes a differential gear device(s) 18 that mechanically couples to an axle(s) 20 or a half-shaft(s) that mechanically couples to a wheel(s) 22 in one embodiment. The differential gear device 18 is coupled to an output member 24 of the hybrid powertrain system 26. The driveline 16 transfers tractive power between the transmission 14 and a road surface via the wheel(s) 22.

The hybrid powertrain system 26 includes an energy storage device (ESD) 28, e.g., a battery, that stores electrical energy and is electrically connected to one or more electric motor/generator(s) 12, to transfer power therebetween. A transmission power inverter control module (TPIM) 30 is positioned between the ESD 28 and the motor/generator(s) 12 and is used to transform battery power from direct current to alternating current and back again. The motor/generator(s) 12 convert stored energy to mechanical power and convert mechanical power to energy that can be stored in the ESD 28. The engine 10 converts fuel to mechanical power.

The motor/generator(s) 12 preferably include three-phase AC machines, each including a stator and a rotor, and a resolver(s) 32. The motor stator for motor/generator(s) 12 is grounded to an outer portion of a transmission case, and includes a stator core with coiled electrical windings extending therefrom. The rotor(s) for the motor/generator(s) 12 are secured to provide torque through the transmission 14 to the driveline 16.

The resolver(s) 32 preferably includes a variable reluctance device including a resolver stator and a resolver rotor. The resolver(s) 32 are appropriately positioned and assembled on the motor/generator(s) 12. The respective stator(s) of the resolver(s) 32 are connected to the stator(s) for the motor/generator(s) 12. The resolver rotors are connected to the rotor for the motor/generator(s) 12. The resolver(s) 32 is signally and operatively connected to the TPIM 30 and senses and monitors rotational position of the resolver rotor relative to the resolver stator, thus monitoring rotational position of the motor/generator(s) 12. Additionally, the signal output from the resolver(s) 32 is interpreted to provide the rotational speed for the motor/generator(s) 12.

Mechanical power from the engine 10 can be transferred to the transmission 14. Mechanical power from the motor/generator(s) 12 can be transferred to the transmission 14. Mechanical power from the driveline 16 can be transferred to the engine 10 and the torque machine(s) 16 via the transmission 14 via the output member 24. The engine 10 is utilized in combination with the motor/generator(s) 12 for transferring torque to the driveline 16 thereby providing tractive torque through the wheel(s) 22. The transferred mechanical power can be in the form of tractive torque for vehicle propulsion, and in the form of reactive torque for vehicle braking associated with regenerative braking functionality. As will be apparent to one of ordinary skill in the art, other hybrid configurations, e.g., series hybrid, parallel hybrid, or compound hybrid drive, or electric drive vehicles may be used without varying from the scope of the disclosure.

The input torque from the engine 10 and the motor torques from the motor/generator(s) 12 are generated as a result of energy conversion from fuel or electrical potential energy stored within the ESD 28. The ESD 28 is high voltage DC-coupled to the TPIM 30 via DC transfer conductors 34. The transfer conductors 34 provide switchable electric current flow between the ESD 28 and the TPIM 30. The TPIM 30 transmits electrical power to and from the motor/generator(s) 12 by transfer conductors 36 to meet the torque commands in response to a motor torques request. Electrical current is transmitted to and from the ESD 28 in accordance with whether the ESD 28 is being charged or discharged.

TPIM 30 includes at least one power inverter(s) and respective motor control module(s) configured to receive the torque commands and control inverter states therefrom for providing motor drive or power regeneration functionality to meet the commanded motor torque(s). The power inverter(s) include known complementary three-phase power electronics device(s), and includes a plurality of insulated gate bipolar transistors (IGBT) for converting DC power from the ESD 28 to AC power for powering motor/generator(s) 12, by switching at high frequencies. The insulated gate bipolar transistors form a switch mode power supply configured to receive control commands. There is typically one pair of insulated gate bipolar transistors for each phase of each of the three-phase motor/generator(s) 12. States of the insulated gate bipolar transistors are controlled to provide motor drive mechanical power generation or battery power regeneration functionality. The three-phase inverters receive or supply DC battery power via DC transfer conductors 34 and transform it to or from three-phase AC power, which is conducted to or from the motor/generator(s) 12 for operation as motors or generators via the transfer conductors 36.

Figure 2:
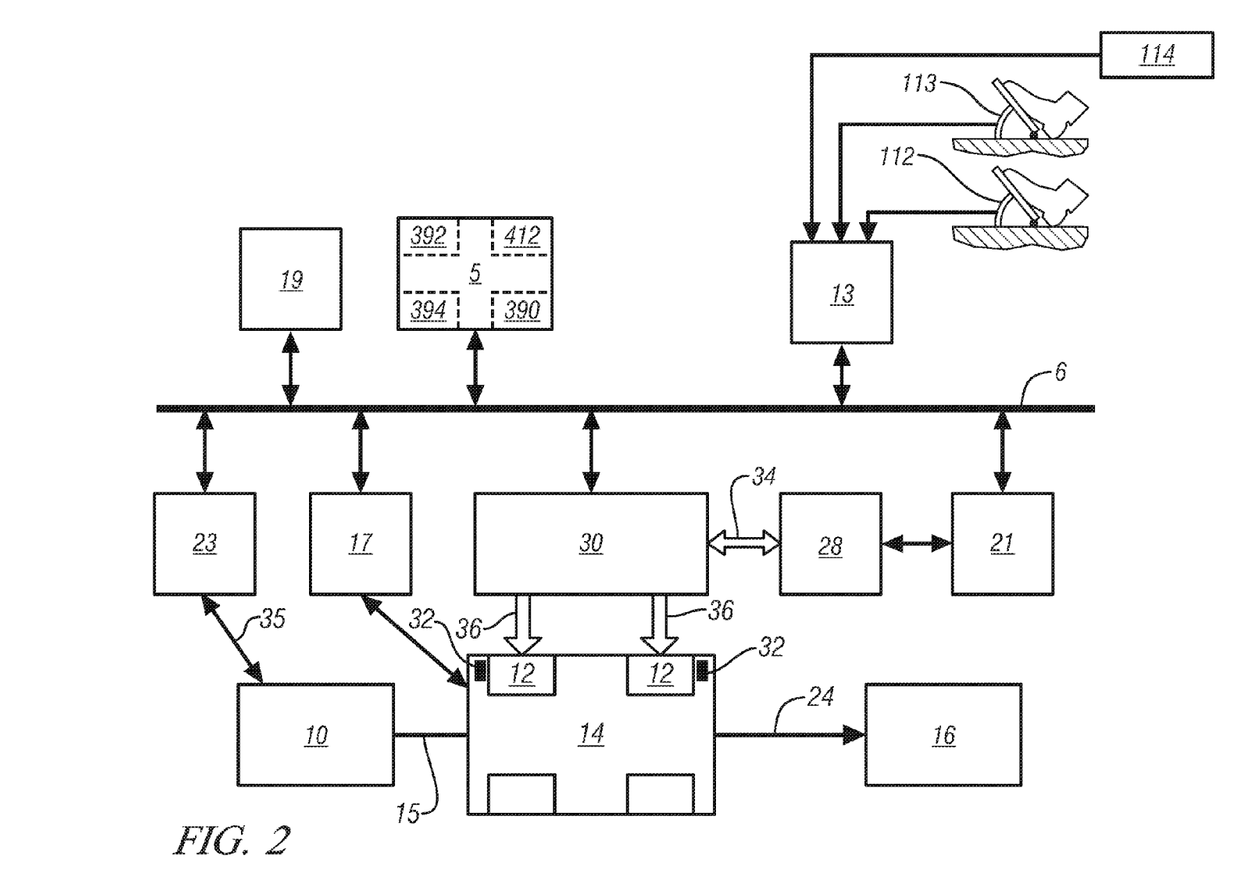
FIG. 2 is a schematic diagram of a distributed control module system for controlling the hybrid powertrain, in accordance with the present disclosure.

FIG. 2 is a schematic diagram of a distributed control module system for controlling the hybrid powertrain. The distributed control module system synthesizes pertinent information and inputs, and executes algorithms to control various actuators to meet control objectives, including objectives related to fuel economy, emissions, performance, drivability, and protection of hardware, including batteries of ESD 28 and the motor/generator(s) 12. The distributed control module system includes an engine control module (ECM) 23, a transmission control module (TCM) 17, a battery pack control module (BPCM) 21, and the TPIM 30. A hybrid control module (HCP) 5 provides supervisory control and coordination of the ECM 23, the TCM 17, the BPCM 21, and the TPIM 30. A user interface 13 is operatively connected to a plurality of devices through which a vehicle operator controls or directs operation of the electro-mechanical hybrid powertrain. The devices include an accelerator pedal 113, an operator brake pedal 112, a transmission gear selector 114, and a vehicle speed cruise control. The transmission gear selector 114 may have a discrete number of operator-selectable positions, including the rotational direction of the output member 24 to enable one of a forward and a reverse direction.

The aforementioned control modules communicate with other control modules, sensors, and actuators via a local area network (LAN) bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communication between individual control modules can also be effected using a direct link, e.g., a serial peripheral interface (SPI) bus.

The HCP 5 provides supervisory control of the hybrid powertrain, serving to coordinate operation of the ECM 23, TCM 17, TPIM 30, and BPCM 21. Based upon various input signals from the user interface 13 and the hybrid powertrain, including the ESD 28, the HCP 5 determines an operator torque request, an output torque command, an engine input torque command, and the motor torques.

The ECM 23 is operatively connected to the engine 10, and functions to acquire data from sensors and control actuators of the engine 10 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 14 at that point in time based upon monitored engine speed and load, which is communicated to the HCP 5. The ECM 23 monitors input from a rotational speed sensor to determine the engine input speed to the input shaft 15, which translates to the transmission input speed. The ECM 23 monitors inputs from sensors to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules.

The TCM 17 is operatively connected to the transmission 14 and monitors inputs from sensors to determine states of transmission operating parameters. The TCM 17 generates and communicates command signals to control the transmission 14. The TCM 17 monitors inputs from pressure switches and selectively actuates pressure control solenoids and shift solenoids of a hydraulic circuit to achieve various transmission operating range states.

The BPCM 21 is signally connected to sensors to monitor the ESD 28, including states of electrical current and voltage parameters, to provide information indicative of parametric states of the batteries of the ESD 28 to the HCP 5. The parametric states of the batteries preferably include battery state-of-charge, actual battery voltage, battery temperature, and available battery power, referred to as a range of minimum battery power to maximum battery power. The HCP 5 can then monitor and control a charge function control scheme 392 and a voltage function control scheme 394.

A brake control module (BrCM) 19 is operatively connected to friction brakes on each of the vehicle wheels. The BrCM 19 monitors the operator input to the brake pedal 112 and generates control signals to control the friction brakes and sends a control signal to the HCP 5 to operate the motor/generator(s) 12 based thereon.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. A control module may have a set of control schemes, including resident software program instructions, algorithms, and calibrations stored in memory and executed to provide the desired functions. The control schemes are preferably executed during preset loop cycles. Control schemes are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, control schemes may be executed in response to occurrence of an event.

In response to operator input via the accelerator pedal 113 and brake pedal 112 as captured by the user interface 13, the HCP 5 and one or more of the other control modules determine torque commands to control the torque generative devices including the engine 10 and motor/generator(s) 12 to meet the operator torque request at the output member 24 and transferred to the driveline 16. Based upon input signals from the user interface 13 and the hybrid powertrain including the ESD 28, the HCP 5 determines the operator torque request, a commanded output torque from the transmission 14 to the driveline 90, an input torque from the engine 10, proper operating range states for the transmission 14, and the motor torques for the motor/generator(s) 12, respectively, as is described hereinbelow.

Final vehicle acceleration can be affected by other factors including, e.g., road load, road grade, and vehicle mass. The operating range state is determined for the transmission 14 based upon a variety of operating characteristics of the hybrid powertrain 26. This includes the operator torque request communicated through the accelerator pedal 113 and brake pedal 112 to the user interface 13 as previously described. The operating range state may be predicated on a hybrid powertrain torque demand caused by a command to operate the motor/generator(s) 12 in an electrical energy generating mode or in a torque generating mode.

The operating range state can be determined by an optimization algorithm or routine which determines optimum system efficiency based upon operator demand for power, battery state of charge, and energy efficiencies of the engine 10 and the motor/generator(s) 12. The control system manages torque inputs from the engine 10 and the motor/generator(s) 12 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 14 required in response to the desired output torque at output member 24 to meet the operator torque request. As should be apparent from the description above, the ESD 28 and the motor/generator(s) 12 are electrically-operatively coupled for power flow therebetween. Furthermore, the engine 10, the motor/generator(s) 12, and the electro-mechanical transmission 14 are mechanically-operatively coupled to transfer power therebetween to generate a power flow to the output member 24.

The distributed control module system controls and manages torque and power flow in a powertrain system having multiple torque generative devices, described hereinbelow with reference to the hybrid powertrain system shown in FIGS. 1 and 2, and residing in the aforementioned control modules in the form of executable algorithms and calibrations. The distributed control module system can be applied to any powertrain system having multiple torque generative devices, including, e.g., a hybrid powertrain system having a single electric machine, a hybrid powertrain system having multiple motor/generator(s) 12, and non-hybrid powertrain systems.

The distributed control module system includes a battery power control scheme as a set of control schemes executed in the hybrid control module 5. The battery power control scheme determines a set of tactical control battery power constraints including a minimum tactical control battery power constraint (412) and a maximum tactical control battery power constraint (390), as will be discussed in further detail with reference to FIG. 4. The distributed control module system also includes a charge function control scheme 392 and a voltage function control scheme 394.

Figure 3:
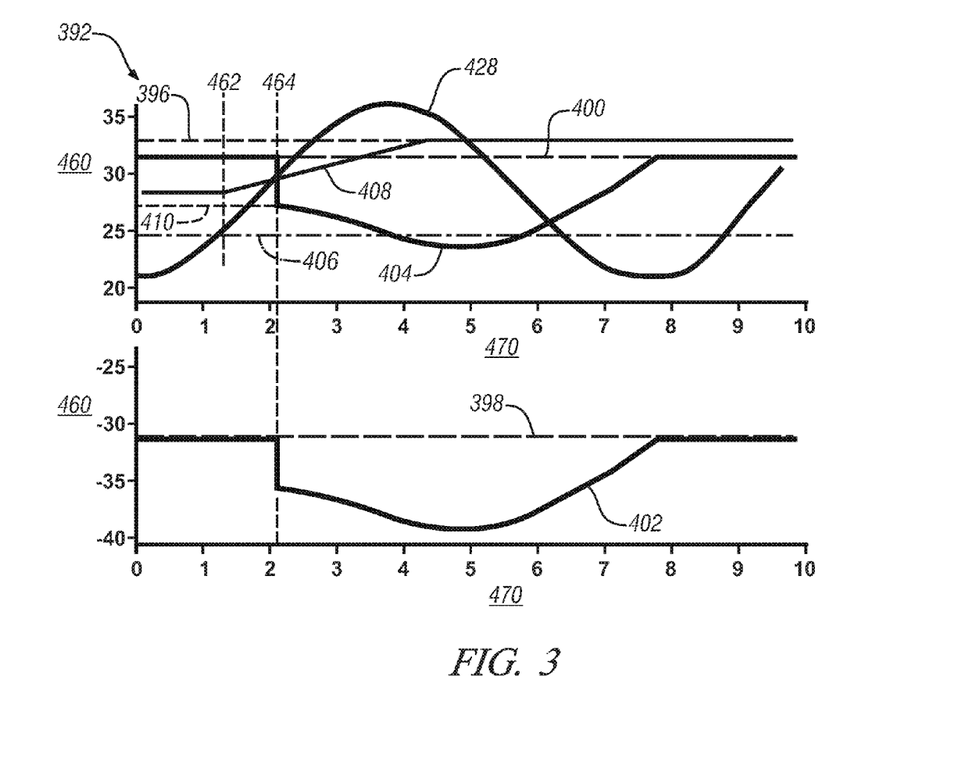
FIG. 3 depicts a graph of results associated with the charge function control scheme in operation including power values in kilowatts as a function of time in seconds for input and output power values of the charge function control scheme, in accordance with the present disclosure.

The charge function control scheme 392 determines a minimum battery power constraint and a maximum battery power constraint based upon a signal indicative of the actual battery output power (428) of the ESD 28 monitored by the BPCM 21, a minimum short-term battery power limit, a maximum short-term battery power limit, a minimum long-term battery power limit 398, a maximum long-term battery power limit 400, and an immediate battery power 410 as determined by a power constraint determination function and discussed in reference to FIG. 3. All of the constraints associated with the charge function control scheme 392 preferably execute simultaneously to constrain battery power. The immediate battery power 410 is an estimated battery output power of the ESD 28 when the engine 10 is operating at an immediate engine torque and when the motor/generator(s) 12 are operating at preferred motor torques based upon the operator torque request and the other inputs of the constraints scheme 364. As used herein, battery power limits include limits on flow of electric power between the ESD 28 and other devices, e.g., the motor/generator(s) 12.

FIG. 3 depicts a graph associated with the charge function control scheme 392 in operation including power values in kilowatts (460), along the vertical axis, as a function of time in seconds (470), along the horizontal axis, for input and output power values of the charge function control scheme 392. The charge function control scheme 392 monitors the actual battery output power (428) of the ESD 28. Power values associated with maximum values refer to discharge limits and are typically positive (motors producing a positive output torque cause a discharge of the ESD 28). Power values associated with minimum values refer to charge limits and are typically negative (motors generate electrical power and charge the ESD 28). The graph depicts operation within the limits along the vertical axis.

A power range determination function is used in the charge function control scheme 392 to determine a set of trigger power limits including an upper trigger power limit (406), a lower trigger power limit, and a set of preferred battery power limits including an upper preferred battery power limit (408) and a lower preferred battery power limit. It should be noted that the upper limits are graphically depicted and will be used for discussion.

The power range determination function sets the upper trigger power limit (406) based on a first power value, preferably below a maximum short-term battery power limit (396). Further, the power range determination function sets the upper preferred battery power limit (408) to an initial value based on a second power value between the maximum short-term battery power limit (396) and the upper trigger power limit (406) when the actual battery output power (428) of the ESD 28 is less than the upper trigger power limit (406). When the actual battery output power (428) of the ESD 28 transgresses (that is, exceeds) the upper trigger power limit (406), as depicted at line 462, the upper preferred battery power limit (408) increases at a predetermined rate from the initial value until the upper preferred battery power limit (408) reaches the maximum short-term battery power limit (396).

Likewise, the power range determination function sets the lower trigger power limit based on a first power value above the minimum short-term battery power limit. Further, the power range determination function sets the lower preferred battery power limit to an initial value between the minimum short-term battery power limit and the lower trigger power limit when the actual battery output power (428) of the ESD 28 is greater than the lower trigger power limit. When the actual battery output power (428) of the ESD 28 transgresses (falls below) the lower trigger power limit, the lower preferred battery power limit decreases at a predetermined rate from the initial value to the minimum short-term battery power limit.

A proportional-differential closed-loop control function is used in the charge function control scheme 392 to determine a limit change rate by which the minimum battery power constraint (402) and the maximum battery power constraint (404) can be modified, utilizing feedback control when the actual battery output power (428) of the ESD 28 transgresses one of the upper preferred battery power limit (408) and the lower preferred battery power limit, as depicted at line 464. The change rate value is determined based on the error between actual battery output power (428) of the ESD 28 and the transgressed one of the upper preferred battery power limit (408) and the lower preferred battery power limit. As long as the actual battery output power (428) of the ESD 28 stays between the upper preferred battery power limit (408) and the lower preferred battery power limit, the maximum battery power constraint (404) and the minimum battery power constraint (402) are not modified by the charge function control scheme 392. Unmodified maximum battery power constraint (404) and unmodified minimum battery power constraint (402) are preferably equivalent to the maximum long-term battery power limit 400 and the minimum long-term battery power limit 398, respectively.

A power constraint determination function is a control scheme used in the hybrid control module 5 to determine the minimum battery power constraint (402) and the maximum battery power constraint (404) based on the limit change rate value, the minimum long-term battery power limit 398, the maximum long-term battery power limit 400, and the immediate battery power 410 of the energy storage device as determined by a tactical control scheme.

When the battery power constraints are not being modified as triggered by the actual battery output power (428) transgressing one of the preferred battery power limits, the power constraint determination function sets the maximum battery power constraint (404) and the minimum battery power constraint (402) to the maximum long-term battery power limit 400 and the minimum long-term battery power limit 398, respectively.

When the actual battery output power (428) of the ESD 28 transgresses the upper preferred battery power limit (408), as depicted at the line 464, the proportional-differential closed-loop control function determines a negative change rate value that is utilized by the power constraint determination function to decrease the maximum and minimum battery power constraints (404), (402) to control the actual battery output power (428) of the ESD 28 to stay within the desired range. Likewise, when the actual battery output power (428) of the ESD 28 transgresses the lower preferred battery power limit, the proportional-differential closed-loop control function determines a positive change rate value that is utilized by the power constraint determination function to increase the maximum and minimum battery power constraints (404), (402) to control the actual battery output power (428) of the ESD 28.

When an immediate battery power 410 is less than the maximum battery power constraint (404), the power constraint determination function sets the maximum battery power constraint (404) to the immediate battery power 410 prior to modifying the maximum battery power constraint (404) based on change rate values. By doing so, a change of the maximum battery power constraint (404) will rapidly effect a maximum input torque value as determined by a torque constraint function, as determined in the hybrid control module 5, and therefore the torque constraint function is able to compensate for errors in the determination of immediate battery power 410, i.e., for a difference between actual battery output power (428) of ESD 28 and immediate battery power 410 as determined by the tactical control scheme. When the immediate battery power 410 is greater than the minimum battery power constraint (402), the power constraint determination function sets the minimum battery power constraint (402) to the immediate battery power 410 prior to modifying the minimum battery power constraint (402) based on change rate values. By doing so, a change of the minimum battery power constraint (402) will rapidly effect a minimum input torque value.

As the power constraint determination function adjusts one of the maximum battery power constraint (404) and the minimum battery power constraint (402) based on the actual battery output power (428) of the ESD 28, the power constraint determination function adjusts the other battery power constraint by the same amount, resulting in the difference between the maximum and minimum battery power constraints (404), (402) remaining unchanged.

Figure 4:
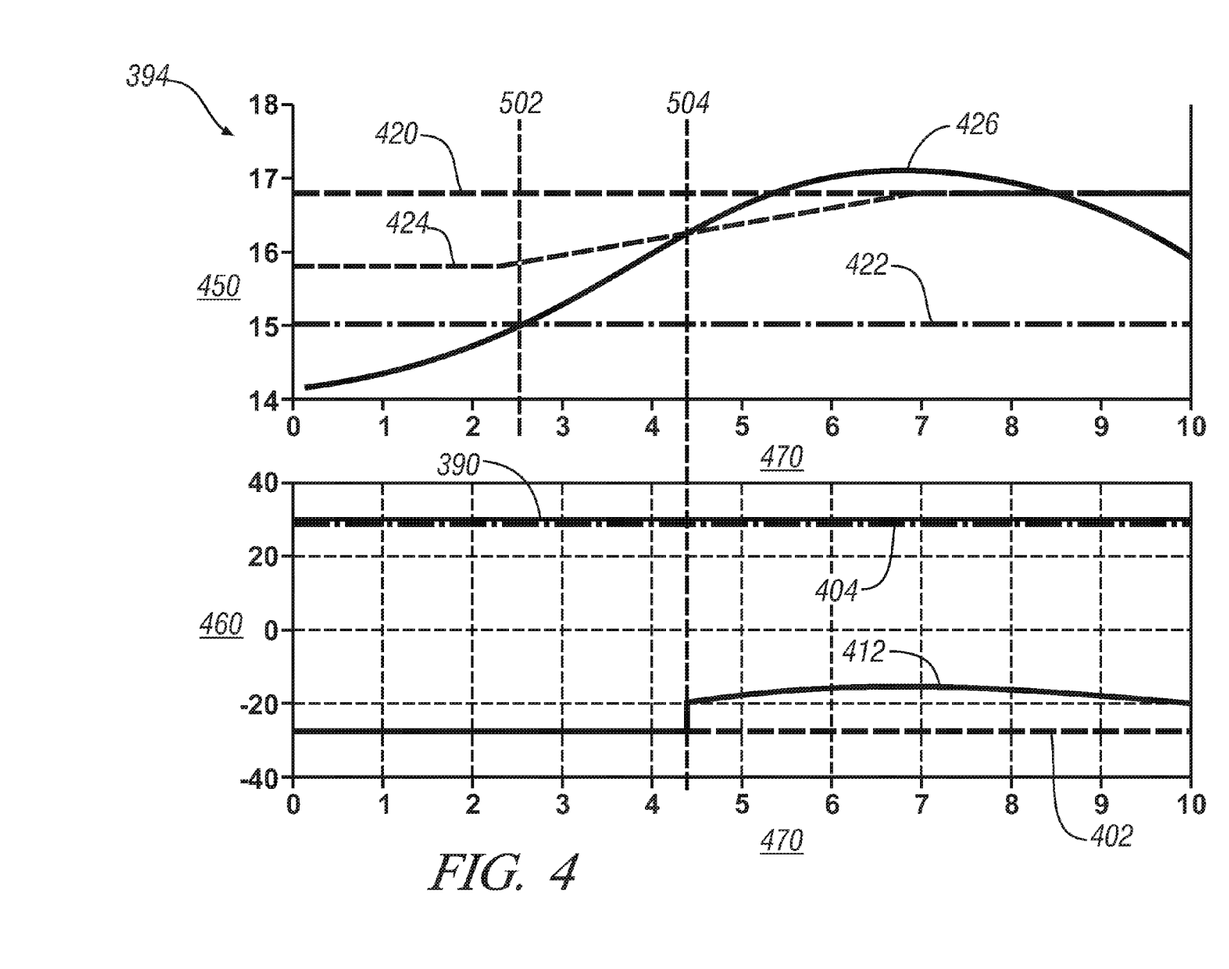
FIG. 4 depicts a graph of the voltage function control scheme including voltage values in volts and power values in kilowatts as a function of time in seconds, in accordance with the present disclosure.

FIG. 4 depicts a graph of the voltage function control scheme 394 including voltage values (450) in volts and power values (460) in kilowatts as a function of time in seconds (470). The voltage function control scheme 394 determines an actual battery voltage (426) of the ESD 28 monitored by the BPCM 21, a maximum base voltage limit (420) of the ESD 28, the maximum battery power constraint (404), and the minimum battery power constraint (402). The voltage function control scheme 394 also determines minimum voltage limits, and a minimum base voltage limit of the ESD 28 that are not depicted on the graph.

The minimum and maximum battery power constraints (402, 404) are intermediate battery power constraint values in that they are utilized to determine the final battery power constraint values, that is, the minimum tactical control battery power constraint (412) and the maximum tactical control battery power constraint (390).

The minimum base voltage limit and maximum base voltage limit 420 define an operating range for the voltage of the ESD 28 and can be determined based on parameters of the powertrain system including, for example, the temperature of the ESD 28. The voltage function control scheme 394 determines and outputs the minimum tactical control battery power constraint (412) and the maximum tactical control battery power constraint (390). The voltage function control scheme 394 includes a preferred voltage range determination function, a proportional-differential closed-loop control function, and a power constraint determination function.

The preferred voltage range determination function determines a set of trigger voltage limits including an upper trigger voltage limit (422), a lower trigger voltage limit, and a set of preferred voltage limits including an upper preferred voltage limit (424) and a lower preferred voltage limit.

The voltage range determination function sets the upper trigger voltage limit (422) based on a first voltage value below the maximum base voltage limit (420). Further, the voltage range determination function sets the upper preferred voltage limit (424) to an initial value based on a second voltage value between the maximum base voltage limit (420) and the upper trigger voltage limit (422) when the actual battery voltage (426) of the ESD 28 is less than the upper trigger voltage limit (422). When the actual battery voltage (426) of the ESD 28 transgresses the upper trigger voltage limit (422) at line 502, the upper preferred voltage limit (424) increases at a predetermined rate from the initial value until the upper preferred voltage limit (424) reaches the maximum base voltage limit (420).

Likewise, the voltage range determination function sets the lower trigger voltage limit based on a first voltage value above the minimum voltage limit similarly to that above but not depicted. Further, the lower preferred voltage limit is set to an initial value between the minimum base voltage limit and the lower trigger voltage limit when the actual battery voltage (426) of the ESD 28 is greater than the lower trigger voltage limit. When the actual battery voltage (426) of the ESD 28 transgresses the lower trigger voltage limit, the lower preferred voltage limit decreases at a predetermined rate from the initial value to the minimum voltage limit.

The proportional-differential closed-loop control function determines a change rate by which the maximum or minimum tactical control battery power constraints (390, 412) are modified utilizing feedback control. The change rate value corresponds to a voltage error between one of the upper preferred voltage limit (424) and the lower preferred voltage limit and the actual battery voltage (426) of the ESD 28.

The power constraint determination function determines the minimum and maximum tactical control battery power constraints (390, 412) based on the limit change rate value, the minimum battery power constraint (402), the maximum battery power constraint (404), and the immediate battery power 410 of the energy storage device as determined by the tactical control scheme.

When the battery power constraints are not being modified as triggered by the actual battery output power (428) transgressing one of the preferred battery power limits, the power constraint determination function sets the maximum tactical control battery power constraint (390) and minimum tactical control battery power constraint (412) to the maximum battery power constraint (404) and minimum battery power constraint (402), respectively.

When the actual battery voltage (426) of the ESD 28 transgresses the upper preferred voltage limit (424), as depicted at line 504, the proportional-differential closed-loop control function determines a positive change rate value that is utilized by a voltage constraint determination function to increase the minimum tactical control battery power constraint (412) to control the actual battery voltage (426) of the ESD 28. Likewise, when the actual battery voltage (426) of the ESD 28 transgresses the lower preferred voltage limit, the proportional-differential closed-loop control function determines a negative change rate value that is utilized by the voltage constraint determination function to decrease the maximum tactical control battery power constraint (390) to control the actual battery voltage (426) of the ESD 28.

When the actual battery voltage (426) of the ESD 28 exceeds the upper preferred voltage limit (424) and when the immediate battery power 410 as determined by the tactical control scheme is greater than the minimum tactical control battery power constraint (412), the voltage constraint determination function sets the minimum tactical control battery power constraint (412) to the immediate battery power 410 prior to modifying the minimum tactical control battery power constraint (412) based on change rate values. When the actual battery voltage (426) of the ESD 28 falls below the lower preferred voltage limit and when the immediate battery power 410, as determined by the tactical control scheme, is smaller than the maximum tactical control battery power constraint (390), the voltage constraint determination function sets the maximum tactical control battery power constraint (390) to the immediate battery power 410 prior to modifying the maximum tactical control battery power constraint (390) based on change rate values.

Unlike the power constraint determination function associated with FIG. 3, the voltage constraint determination function adjusts only one of the minimum and maximum tactical control battery power constraints (412, 390) without adjusting the other one of the tactical control battery power constraints (412, 390), thus limiting the operating range of the motors and therefore reducing the allowed torque range for the engine control.

The exemplary battery power control scheme is described in further detain in commonly assigned and co-pending U.S. patent application Ser. No. 12/243,095, the contents of which are incorporated herein by reference.

Figure 5:
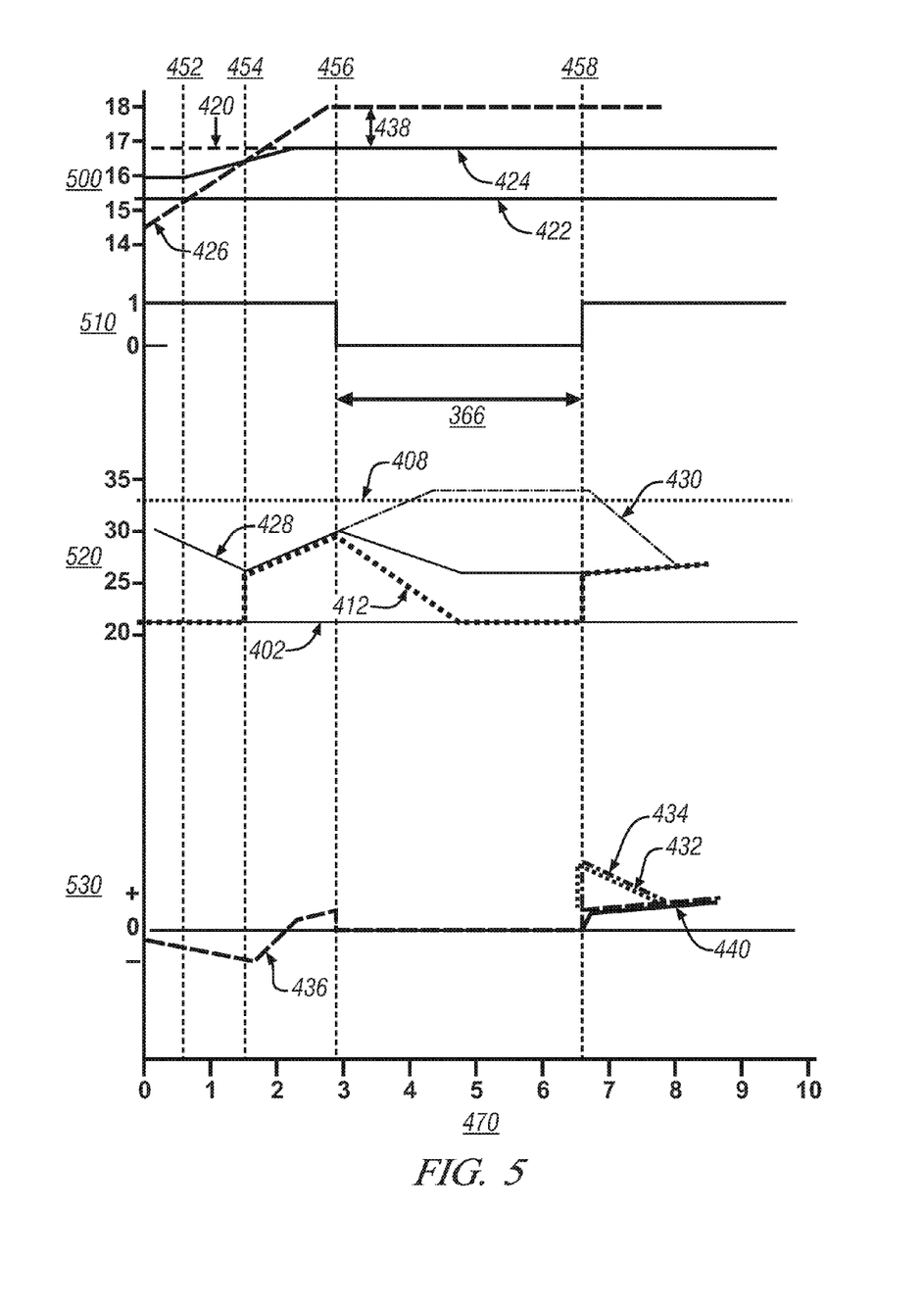
FIG. 5 graphically shows states of parameters associated with operation of the battery power control scheme described hereinabove, including actual battery voltage, authority, battery power, and commanded output torque of the control system to control and limit battery power, in accordance with the present disclosure.

FIG. 5 graphically shows states of parameters associated with operation of the battery power control scheme described hereinabove, and includes a graph depicting parameters associated with battery voltage (500), a graph depicting power limit authority (510), a graph depicting parameters associated with battery power (520), and a graph depicting commanded output torque (530) of the control system to control and limit battery power. Controlling battery power is an element of an overall control scheme to control system power and thereby manage output torque of the hybrid powertrain system 26 in conjunction with maximum and minimum motor torque limits of the motor torque command(s) controlling the motor/generator(s) 12 and maximum and minimum limits on the torque capacities of torque transfer devices of the transmission 14. The commanded output torque (436) is initially close to zero or negative during operation of the system, as shown. It is understood, however, that the commanded output torque (436) can be greater than zero. Operating conditions can include an increase in the actual battery voltage (426) and a decrease (i.e., an increase in the magnitude of charge of the ESD 28) in actual battery output power (428). The control system compares the actual battery voltage (426) with the upper preferred voltage limit (424) to determine if actual battery voltage (426) has transgressed the upper trigger voltage limit (422), indicated at line 452. Such a condition may occur when a traction control event occurs, when the transmission 14 is shifted into neutral, or when conditions occur that may cause a loss of control of output torque. When the actual battery voltage transgresses the upper trigger voltage limit (422), the upper preferred voltage limit (424) begins to increase as described above in relation to FIG. 4.

At line 454, when the actual battery voltage (426) exceeds the upper preferred voltage limit (424), the proportional-differential closed-loop control function determines a change rate by which the minimum tactical control battery power constraint (412) is modified, using feedback control, including an initial step-function (differential) increase. The change rate value in the tactical control battery power constraint (412) is proportionate to the voltage error (438) between the upper preferred voltage limit (424) and the actual battery voltage (426) of the ESD 28 and a derivative of the error. The actual battery output power (428) increases corresponding thereto.

At line 456, the control system loses power limit authority, i.e., the ability to control or manage battery power. The loss of power limit authority can result from the transmission 14 shifting into neutral, a traction control event, and other operating conditions, e.g., when a higher priority constraint conflicts with battery power limits. A result of losing power limit authority is that the output torque command (436) becomes zero, as is shown in the illustrated example when the transmission 14 shifts to Neutral. Other operating states wherein the control system loses power limit authority include clutch slip remediation, when the engine 10 is commanded OFF, and the torque is generated using motor/generator(s) 12. It will be apparent to one of ordinary skill in the art that the output torque command (436) may not always become zero but is used herein in exemplary fashion.

When the control system loses power limit authority, the battery power control scheme is disabled or otherwise discontinued, for example during the period indicated at 366. Disabling the battery power control scheme is preferred since once the power limit authority is lost, closed loop control functions, e.g., the proportional differential closed-loop control function, will otherwise continue to adjust in an attempt to manage the actual battery output power (428) by increasing battery power (430) until the battery power (430) saturates, shown at line 456. If the minimum tactical control battery power constraint (412) maintains the battery power control scheme, the actual battery power (430) would otherwise approach and exceed the upper preferred power limit (408) thereby indicating the saturation of battery power.

However, in the exemplary operation with the battery power control scheme disabled or otherwise discontinued, the minimum tactical control battery power constraint (412) begins to ramp down to the minimum battery power constraint (402), or another default power limit.

At line 458, the control system regains power limit authority, e.g., the transmission 14 is shifted into gear or traction control ends. The minimum tactical control battery power constraint (412) increases to the actual battery output power (428) and the battery power control scheme is re-enabled. Likewise, the output torque command (436) increases to a minimum torque value (440), e.g., a creep torque that is greater than zero, which constrains the output torque command (436) according to torque security control schemes to limit changes in torque output to driveline 64 limit the magnitude of induced g-forces associated with a sudden high torque output command in the embodiment shown.

For purposes of comparison, a representative output torque command (434) without the disclosed control scheme but maintaining the battery power control scheme throughout the aforementioned event is shown. The output torque command without (434) would otherwise be forced to at least a minimum output torque (432) with the battery power control scheme governed by the minimum tactical control battery power constraint (412) maintaining the battery power control scheme. The sudden rise of the output torque command without (434) may cause undesirable drivetrain disruptions. The output torque command without (434) and the minimum output torque (432) eventually recover and return to an acceptable output torque command much later than without disabling the battery power control scheme.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a hybrid powertrain system including an internal combustion engine and a torque machine wherein electrical energy is controllably transferred between an electric energy storage device and the torque machine by a control system, said control system executing the following steps comprising:
monitoring magnitudes of an actual voltage, an actual current, and an actual power output of the electric energy storage device;
executing, using a central processing unit, a battery power control scheme to control the output power of the electric energy storage device associated with the electrical energy transferred between the electric energy storage device and the torque machine, comprising:
setting a trigger voltage limit at a first voltage value below a base voltage limit, said base voltage limit defining an operating range for the voltage of the electrical energy storage device,
when the monitored magnitude of actual power is not exceeding a preferred power limit, setting a magnitude of maximum and minimum tactical control power constraints of the electric energy storage device equal to the preferred power limit,
when the monitored magnitude of actual voltage is less than the trigger voltage limit, setting a preferred voltage limit to an initial value based on a second voltage value between the base voltage limit and the trigger voltage limit,
when the monitored magnitude of actual voltage exceeds the trigger voltage limit, increasing a magnitude of the preferred voltage limit at a predetermined rate from the initial value until the preferred voltage limit reaches the base voltage limit
when the monitored magnitude of actual voltage exceeds the magnitude of the preferred voltage limit, one of
increasing the minimum tactical control power constraint by a positive change rate value without adjusting the maximum tactical control power constraint, and decreasing the maximum tactical control power constraint by a negative change rate value without adjusting the minimum tactical control power constraint;

disabling, using a central processing unit, the battery power control scheme when the control system loses a power limit authority associated with the electrical energy transferred between the electric storage device and the torque machine during ongoing operation, wherein said loss of the power limit authority results from a loss of control of output torque from the hybrid powertrain system, comprising one of:

if the minimum tactical control power constraint was increased by the positive change rate value, ramping down the minimum tactical control power constraint to the magnitude equal to the preferred power limit, and if the maximum tactical control power constraint was decreased by the negative change rate value, ramping up the maximum tactical control power constraint to the magnitude equal to the preferred power limit; and re-enabling the battery power control scheme when the control system regains the power limit authority.

2. The method of claim 1, wherein re-enabling the battery power control scheme when the control system regains the power limit authority includes modifying a commanded output torque for the hybrid powertrain to a minimum torque.

3. The method of claim 2, wherein modifying the commanded output torque command for the hybrid powertrain to the minimum torque includes constraining the commanded output torque command to limit undesirable drivetrain disruptions.

4. The method of claim 1, wherein executing the battery power control scheme to control the output power of the electric energy storage device comprises: determining a voltage error between the monitored actual battery voltage and the magnitude of the preferred voltage limit; and determining a change rate for a battery power constraint as a proportional-differential function of the voltage error.

5. The method of claim 1, wherein loss of the power limit authority associated with the electrical energy transferred between the electric storage device and the torque machine during ongoing operation comprises a loss of control of output torque.

6. The method of claim 1, wherein disabling the battery power control scheme when the control system loses power limit authority associated with the electrical energy transferred between the electric storage device and the torque machine during ongoing operation causes a battery power constraint to converge with a minimum battery power constraint.

7. The method of claim 1, wherein the re-enabling the battery power control scheme when the control system regains power limit authority comprises modifying a battery power constraint to achieve an actual battery power level.

8. Method for controlling a hybrid powertrain system including an internal combustion engine and a torque machine wherein electrical energy is controllably transferred between an electric energy storage device and the torque machine by a control system, said control system executing the following steps comprising:

monitoring magnitudes of an actual voltage, an actual current, and an actual power output of the electric energy storage device;

executing, using a central processing unit, a battery power control scheme to control the output power of the electric energy storage device to control a torque output of the torque machine, comprising:

setting a trigger voltage limit at a first voltage value below a base voltage limit, said base voltage limit defining an operating range for the voltage of the electrical energy storage device, when the monitored magnitude of actual power is not exceeding a preferred power limit, setting a magnitude of maximum and minimum tactical control power constraints of the electric energy storage device equal to the preferred power limit when the monitored magnitude of actual voltage is less than the trigger voltage limit, setting a preferred voltage limit to an initial value based on a second voltage value between the base voltage limit and the trigger voltage limit, when the monitored magnitude of actual voltage exceeds the trigger voltage limit, increasing a magnitude of the preferred voltage limit at a predetermined rate from the initial value until the preferred voltage limit reaches the base voltage limit when the monitored magnitude of actual voltage exceeds the magnitude of the preferred voltage limit, one of increasing the minimum tactical control power constraint by a positive change rate value without adjusting the maximum tactical control power constraint, and decreasing the maximum tactical control power constraint by a negative change rate value without adjusting the minimum tactical control power constraint;

disabling, using a central processing unit, the battery power control scheme when the control system loses power limit authority during ongoing operation, wherein said loss of the power limit authority results from a loss of control of output torque from the hybrid powertrain system, comprising one of:

if the minimum tactical control power constraint was increased by the positive change rate value, ramping down the minimum tactical control power constraint to the magnitude equal to the preferred power limit, and if the maximum tactical control power constraint was decreased by the negative change rate value, ramping up the maximum tactical control power constraint to the magnitude equal to the preferred power limit;

re-enabling the battery power control scheme when the control system regains power limit authority during ongoing operation; and modifying a commanded torque output to a minimum value to limit sudden torque output during the re-enabling of the battery power control scheme.

9. The method of claim 8, wherein executing the battery power control scheme to control the output power of the electric energy storage device comprises: determining a voltage error between the monitored actual battery voltage and the magnitude of the preferred voltage limit; and determining a change rate for a battery power constraint as a proportional-differential function of the voltage error.

10. The method of claim 8, wherein disabling the battery power control scheme when the control system loses power limit authority associated with the electrical energy transferred between the electric storage device and the torque machine during ongoing operation causes a battery power constraint to converge with a minimum battery power constraint.

11. The method of claim 8, wherein the re-enabling the battery power control scheme when the control system regains power limit authority comprises modifying a battery power constraint to achieve an actual battery power level.

12. Method for controlling a hybrid powertrain system including an internal combustion engine and a torque machine wherein electrical energy is controllably transferred between an electric energy storage device and the torque machine by a control system, said control system executing the following steps comprising:
- monitoring magnitudes of an actual voltage, an actual current, and an actual power output of the electric energy storage device;
- executing, using a central processing unit, a battery power control scheme to control the output power of the electric energy storage device to control a torque output of the torque machine, comprising:
  - setting a trigger voltage limit at a first voltage value below a base voltage limit, said base voltage limit defining an operating range for the voltage of the electrical energy storage device,
  - when the monitored magnitude of actual power is not exceeding a preferred power limit, setting a magnitude of maximum and minimum tactical control power constraints of the electric energy storage device equal to the preferred power limit,
  - when the monitored magnitude of actual voltage is less than the trigger voltage limit, setting a preferred voltage limit to an initial value based on a second voltage value between the base voltage limit and the trigger voltage limit,
  - determining a voltage error between the monitored magnitude of actual voltage and the preferred voltage limit,
  - when the monitored magnitude of actual voltage exceeds the trigger voltage limit, increasing a magnitude of the preferred voltage limit at a predetermined rate from the initial value until the preferred voltage limit reaches the base voltage limit,
  - when the monitored magnitude of actual voltage exceeds the magnitude of the preferred voltage limit, one of
    - increasing the minimum tactical control power constraint by a positive change rate value without adjusting the maximum tactical control power constraint;
    - determining a negative change rate value to decrease the maximum tactical control power constraint without adjusting the minimum tactical control power constraint;
  - limiting battery power in accordance with the minimum tactical control power constraint and the maximum tactical control power constraint;
- disabling, using a central processing unit, the battery power control scheme when the control system loses power limit authority during ongoing operation to cause a battery power constraint to converge with a minimum battery power constraint, wherein said loss of the power limit authority results from a loss of control of output torque from the hybrid powertrain;
- re-enabling the battery power control scheme when the control system regains power limit authority during ongoing operation; and
- modifying a commanded torque output to a minimum value to limit sudden torque output during the re-enabling of the battery power control scheme.

13. The method of claim 1, wherein the hybrid powertrain system further includes a transmission configured to transfer torque between the internal combustion engine, the torque machine, and an output member; and wherein disabling the battery power control scheme when the control system loses a power limit authority associated with the electrical energy transferred between the electric storage device and the torque machine during ongoing operation comprises disabling the battery power control scheme in response to the transmission shifting into neutral.

14. The method of claim 1, wherein the hybrid powertrain system further includes a transmission configured to transfer torque between the internal combustion engine, the torque machine, and an output member; and wherein disabling the battery power control scheme when the control system loses a power limit authority associated with the electrical energy transferred between the electric storage device and the torque machine during ongoing operation comprises disabling the battery power control scheme in response to clutch slip remediation in the transmission.

15. The method of claim 1, wherein the hybrid powertrain system is configured to transfer torque to a driveline to provide tractive torque to drive wheels; and wherein disabling the battery power control scheme when the control system loses a power limit authority associated with the electrical energy transferred between the electric storage device and the torque machine during ongoing operation comprises disabling the battery power control scheme in response to a traction control event associated with the drive wheels.

16. The method of claim 1, wherein disabling the battery power control scheme when the control system loses a power limit authority associated with the electrical energy transferred between the electric storage device and the torque machine during ongoing operation comprises disabling the battery power control scheme when the engine 10 is commanded OFF and the output torque is generated using the torque machine.

* * * * *